(12) United States Patent
Edwards et al.

(10) Patent No.: US 7,996,711 B2
(45) Date of Patent: Aug. 9, 2011

(54) MEMORY ERRORS

(75) Inventors: David Alan Edwards, Bristol (GB); Joe Woodward, Staffs (GB)

(73) Assignee: Icera Inc., Wilmington, DE (US)

( * ) Notice: Subject to any disclaimer, the term of this patent is extended or adjusted under 35 U.S.C. 154(b) by 217 days.

(21) Appl. No.: 12/323,563

(22) Filed: Nov. 26, 2008

(65) Prior Publication Data
US 2009/0138754 A1   May 28, 2009

(30) Foreign Application Priority Data

Nov. 28, 2007 (GB) .................................. 0723316.6

(51) Int. Cl.
*G06F 11/00* (2006.01)
(52) U.S. Cl. .......................... 714/6.11; 714/6.12; 714/36
(58) Field of Classification Search .................. 714/5, 6, 714/36, 53, 5.1, 6.11, 6.12, 54
See application file for complete search history.

(56) References Cited

U.S. PATENT DOCUMENTS

| | | | | | |
|---|---|---|---|---|---|
| 5,815,447 | A | * | 9/1998 | Thomann | 365/200 |
| 6,079,016 | A | * | 6/2000 | Park | 713/2 |
| 6,571,347 | B1 | * | 5/2003 | Tseng | 714/6 |
| 6,625,754 | B1 | * | 9/2003 | Aguilar et al. | 714/15 |
| 6,792,556 | B1 | * | 9/2004 | Dennis | 714/6 |
| 7,143,275 | B2 | * | 11/2006 | Cepulis et al. | 713/1 |
| 7,194,659 | B2 | * | 3/2007 | Buchanan et al. | 714/36 |
| 7,206,971 | B2 | * | 4/2007 | Zeller et al. | 714/36 |
| 7,398,425 | B2 | * | 7/2008 | Yanagawa | 714/36 |
| 7,650,556 | B2 | * | 1/2010 | Lee | 714/758 |
| 7,765,393 | B1 | * | 7/2010 | Lee et al. | 713/2 |
| 2002/0087855 | A1 | | 7/2002 | Dykes et al. | |
| 2004/0199825 | A1 | * | 10/2004 | Zeller et al. | 714/36 |
| 2005/0039081 | A1 | * | 2/2005 | Chang et al. | 714/36 |
| 2007/0100852 | A1 | * | 5/2007 | Wang et al. | 707/100 |
| 2008/0005450 | A1 | * | 1/2008 | Bangalore | 711/103 |
| 2008/0082727 | A1 | * | 4/2008 | Wang | 711/103 |
| 2008/0098257 | A1 | * | 4/2008 | Blinick et al. | 714/5 |

FOREIGN PATENT DOCUMENTS

| | | |
|---|---|---|
| GB | 2404261 A | 1/2005 |
| GB | 0723316.6 | 3/2009 |
| WO | WO0140946 A1 | 6/2001 |

* cited by examiner

*Primary Examiner* — Yolanda L Wilson
(74) *Attorney, Agent, or Firm* — Ryan, Mason & Lewis, LLP

(57) ABSTRACT

The present invention provides a method of protecting against errors in a boot memory, the method comprising initiating booting of a processor by executing primary boot code from a primary boot memory, and based on the execution of the primary boot code: accessing a data structure comprising a plurality of redundant portions of boot information stored on a secondary boot memory; performing an error check on a plurality of the portions to determine whether those portions contain errors and, based on the error checks, to identify a valid portion; and booting the processor using the valid portion of boot information.

46 Claims, 5 Drawing Sheets

MEMORY ERRORS

PRIORITY CLAIM

The present application claims the priority of Great Britain Patent Application No. 0723316.6 filed Nov. 28, 2007.

FIELD OF THE INVENTION

The present invention relates to coping with errors in a non-volatile storage medium with error properties, one example of which is a NAND flash memory.

BACKGROUND

Memory reliability is an important issue. This is particularly (but not exclusively) true of flash memory devices and especially NAND flash memory which is becoming a rapidly more popular form of solid-state memory for use in portable and/or consumer applications.

This popularity can be attributed to NAND flash's fast decline in price per unit storage over the past years, making it very competitive compared to more established media such as tape, compact discs and magnetic hard disk drives. In addition, it is more shock resistant than CDs or hard drives (flash memory requires no moving parts), more compact (smaller form factor), more systemically consistent with the rest of the solid-state device, and requires lower power.

NOR memory doesn't normally contain manufacture time errors, but is typically more expensive and less dense than other memory technologies such as NAND which unfortunately do have error management issues.

As illustrated schematically in FIG. 1, memories such as NAND flash devices are divided into a plurality of areas in the form of blocks 2, each block 2 being divided into a plurality of pages 4. FIG. 1 shows four such blocks 2a-2d contiguous in address space, but it will be appreciated that there will typically be many more blocks and also that the figure is schematic such that the blocks are not necessarily physically arranged like this on the chip. For simplicity only block 2a is illustrated as being divided pages 4, but each other block 2 is also divided into pages and the number of pages shown is again schematic.

Reading of the memory is performed on a per-page basis. Writing involves erasing on a per-block basis then programming pages within that block. This has manufacturer or device specific issues. For example, some manufacturers say that following erase, pages within the block should be programmed in sequential order, etc. Others don't mention ordering issues but suggest that all pages in a block must be programmed before other operations are performed to increase the block's lifetime.

If any page within a block is "bad" then the block should be considered bad and should not be used. Some blocks can be bad on manufacture, and are tagged as such by the manufacturer in a particular page of each bad block. "Bad" means at least one page within the block has at least one byte which is known to not read reliably. Also, some manufacturers say that writing to bad blocks can actually cause other blocks to fail.

Errors may also develop at a later date, after manufacture. For example, NAND flash memory experiences "write disturbance" whereby it wears out when erased and programmed too many times (as mentioned, a write is a combination of erasing a block and then programming one or more pages). Techniques to correct or compensate for such wear are known in the art, for example flash file system software using erase/program wear-levelling. Further, random radiation errors may occur for example when a cosmic ray or alpha particle passes through a memory cell causing a bit to change from logic-one to a logic-zero or vice-versa. Again, techniques for coping with such errors are known.

The errors in question may be hard errors or soft errors. Soft errors are errors whereby the cell in which the error occurs can be rewritten, and hard errors are errors which cause a cell to be permanently bad.

A number of techniques also exist for initially detecting errors. These include the use of error correction codes (ECCs), cyclic redundancy checks (CRCs), and parity checks. Details of such techniques will be familiar to a person skilled in the art.

Nonetheless, there is still scope to improve the reliability of memory devices.

Aside from errors such as write-disturbance errors or random errors, the lifetime of a memory device may also be limited by the effect of read disturbance due to too many reads. However, there is currently very little awareness of this problem in the art, with manufacturers' data sheets giving no concrete data about the extent of the problem. Accordingly, it is not surprising that little if anything has currently been done to consider how, when or in what circumstances read disturbance should be addressed. In fact, the problem is generally ignored, which could be the cause of many unexplained failures in a wide range of devices.

SUMMARY

If a device is switched on and off or rebooted many times, then the boot memory will need to be read many times, potentially causing read-disturbance errors which could result in boot failure. But because the boot memory is very rarely written to, and because boot code is typically implemented only in ROM which is robust against random radiation errors, then the above lack of awareness regarding read-disturbance means error detection has not conventionally been applied to boot memory. Boot code is conventionally very simple and does not conventionally contain a mechanism for handling errors.

According to one aspect of the invention, there is provided a method of protecting against errors in a boot memory, the method comprising initiating booting of a processor by executing primary boot code from a primary boot memory, and based on the execution of the primary boot code: accessing a data structure comprising a plurality of redundant portions of boot information stored on a secondary boot memory; performing an error check on a plurality of said portions to determine whether those portions contain errors and, based on the error checks, to identify a valid portion; and booting the processor using said valid portion of boot information.

Thus the present invention advantageously provides a mechanism for checking and circumventing read-disturbance errors in a boot memory. Further, the use of redundant information is particularly suitable in the context of a boot memory. The use of error correction code algorithms to re-write bad areas of memory or move data to new areas are more conventionally preferred for general purpose applications. However, when the system has yet to boot from the memory, then it may not be in a state where such moving or re-writing of data is possible (or at least easily achievable). By use of a data structure in the form of redundant portions of boot information, accessed by a primary memory from a secondary memory, the present invention greatly improves the chance that a valid boot can be achieved without the need to re-write or move data.

In embodiments, the plurality of redundant portions may comprise a plurality of redundant bad-area maps stored at predetermined memory locations within the secondary boot memory, each map identifying bad areas within the secondary boot memory; the performing of said error checks may comprise performing an error check on a plurality of said maps to determine whether those maps contain errors and to identify a valid map; and the booting of the processor using the valid boot information may comprise using the valid map to acquire a valid boot image and booting the processor using the valid boot image.

The plurality of redundant portions may comprise a plurality of redundant boot images stored on the secondary boot memory; the performing of said error checks may comprise performing an error check on a plurality of said boot images to determine whether those images contain errors and to identify a valid boot image; and the booting of the processor using the valid boot information may comprise booting the processor using the valid boot image.

The plurality of redundant portions may comprise a plurality of redundant first headers, each first header specifying at least the memory locations of said boot images within the secondary boot memory; the performing of said error checks may comprise performing an error check on a plurality of said first headers to determine whether those headers contain errors and to identify a valid first header; and the booting of the processor using the valid boot information may comprise locating the valid boot image using the valid first header.

These data structure features, either individually or preferably in combination, have been found to be particularly effective in protecting a boot memory against errors, both in terms of avoiding the effects of errors in the secondary memory and allowing efficient access to the structure from the primary memory. The multiple redundant images greatly improve the probability that a valid boot image will be present. The multiple redundant first headers improve the probability that these images can be found, and the multiple redundant maps improve the probability that bad areas can be successfully avoided when acquiring the image. Indeed, by means of such a data structure, the probability that the boot will be rendered inoperable due to read-disturbance errors is negligible for most practical purposes.

Preferably, the second boot memory may be divided into areas, at least one of which areas may be determined to be error free upon manufacture; and at least one of the bad area maps and first headers may be accessed from said error-free area.

By including one of the maps and/or first headers in a typically "manufacturer-guaranteed" error-free area, this further improves the probability of finding a valid header and/or map and therefore the probability that a valid boot image can be successfully acquired.

In further embodiments, each of said boot images may include a second header; and the performing of said error checks may comprises performing an error check on a plurality of the second headers, and only performing an error check on the remainder of the respective boot image if no error is found in the corresponding second header.

Checking for errors in the second header (image header) before the remainder of the image improves efficiency of the check.

Furthermore, each of the boot images may be public-key encrypted such that it is security signed; and the performing of said error checks on each of said boot images may comprise performing a decryption on each of the boot images, the error check doubling as an authorisation check such that if an error is found the image is deemed not be authorised.

Thus by using public key encryption techniques in the image header and boot image, the checking for errors may advantageously be combined with a security check.

In further embodiments, the secondary boot memory may comprise a flash memory, the data structure being stored on the flash memory. The flash memory may comprise a NAND flash memory. The flash memory may comprise one of: an NRAM, an MRAM, and an FeRAM. The secondary boot memory may be of a type susceptible to hard and soft errors.

Given the lack of awareness regarding read disturbance in flash memory, it amounts to a substantial leap to introduce error detection and handling into a flash boot memory by means of a redundant information data structure. Flash memory, and especially NAND flash, is in fact particularly susceptible to read disturbance. The inventors believe that other newly emerging types of memory such as NRAM (nano-RAM), MRAM (Magnetoresistive RAM) and FeRAM (Ferroelectric RAM) may also experience similar read-disturbance issues to NAND flash, or indeed any memory susceptible to hard and soft errors.

In further embodiments, the primary boot memory may be a separate memory device from the second boot memory.

The use of redundant information is particularly suitable in the context of a separate secondary flash boot memory, because the flash error handling algorithms are device and/or manufacturer specific and therefore preferably stored within the device itself. But until the boot has been completed, this code is not accessible, and so it is useful to provide some other mechanism allowing the primary boot memory to cope with errors in a less device specific manner.

In further embodiments, the primary boot memory may comprise a ROM, the primary boot code being stored on the ROM.

The combination of a primary boot ROM and re-writable secondary memory such as a flash is particularly advantageous. The re-writable memory is flexible and readily customizable, but susceptible to errors. The ROM is robust against errors but can be written only once. Thus by providing a redundant data structure in the secondary memory, the inflexible but error-free primary ROM boot memory can initiate basic booting which will include accessing this redundant data structure to invoke more flexible boot code from a more error prone secondary flash boot memory.

In further embodiments, the method may comprise correcting for an error detected by one of said error checks using error handling code retrieved from the secondary boot memory following the booting of the processor using the valid boot information.

As mentioned, memory devices such as flash memory (and potentially others) have error handing code such as ECCs which is specific to a particular device or manufacturer. But it is not convenient for the designer of a system to program their primary boot memory with one particular secondary memory in mind. In embodiments, the data structure of the present invention advantageously allows error handling code which is specific to the secondary memory to be implemented in the secondary memory, whilst also allowing the use of more generic primary boot code which only need know how to access the data structure and not the nature of the specific error handling code.

In further embodiments, the method may comprise correcting for an error detected by one of said error checks by re-writing a portion containing an error from the valid portion.

The second boot memory may be divided into areas, with each of said redundant portions comprising a plurality of areas, and said re-writing may comprise re-writing only the area or areas in which an error was detected.

So the data structure of the present invention may also advantageously allow individual areas to be re-written rather than forcing the whole image to be re-written.

In further embodiments, the second boot memory may be divided into areas, with each of said redundant portions comprising a plurality of areas, and the re-writing may be performed in reverse address order.

The erasing/programming of the areas in backwards order is advantageous because rebooting can still be achieved if the power is removed or lost during the erasing or programming.

In further embodiments, the method may comprise: making a copy of the bad area map separate from each of said redundant maps; and implementing a file system in the secondary memory using said copy of the bad area map, including reprogramming said copy of the bad area map in association with use of the file system without performing a corresponding reprogramming of the redundant maps.

This extends the life of the secondary memory by separating the bad block management of the file system from the bad block management of the primary boot memory, thus avoiding repeated erase/write and associated erase errors and write disturb errors in the redundant maps.

In further embodiments, the method may comprise: creating an additional data structure accessible from the primary boot memory, the additional data structure containing information on errors found in the secondary boot memory during said error check; wherein said booting using the valid information from the secondary boot memory comprises accessing said additional data structure from the primary boot memory.

This reduces the amount of read disturbance on booting.

According to another aspect of the present invention, there is provided a system for protecting against errors when booting, comprising: a processor; a primary boot memory; and a secondary boot memory formatted according to a data structure comprising a plurality of redundant portions of boot information stored on a secondary boot memory; wherein the primary boot memory is configured to supply primary boot code to the processor which, when executed, performs an error check on a plurality of said portions to determine whether those portions contain errors and, based on the error checks, to identify a valid portion; and the processor is arranged to boot using said valid portion of boot information.

According to another aspect of the present invention, there is provided a method of formatting a boot memory to protect against errors in the boot memory, the method comprising: collecting bad information on bad areas at respective memory locations within the memory and creating a map specifying the memory locations of the bad areas; writing a plurality of redundant boot images to further respective memory locations and creating a memory header comprising the memory locations of the boot images; writing a plurality of redundant copies of the memory header to the memory; and writing a plurality of redundant copies of the maps to the memory.

According to another aspect of the present invention, there is provided a boot memory formatted according to a data structure for protecting against errors in the boot memory, the data structure comprising: a plurality of redundant boot images at respective memory locations, a plurality of redundant memory headers each identifying the memory locations of said boot images, and a plurality of redundant maps identifying further memory locations of bad areas within the memory.

The present invention also provides a suitable computer program and software development tool.

For a better understanding of the present invention and to show how it may be carried into effect, reference will now be made by way of example to the accompanying drawings.

DETAILED DESCRIPTION

Figure 1:
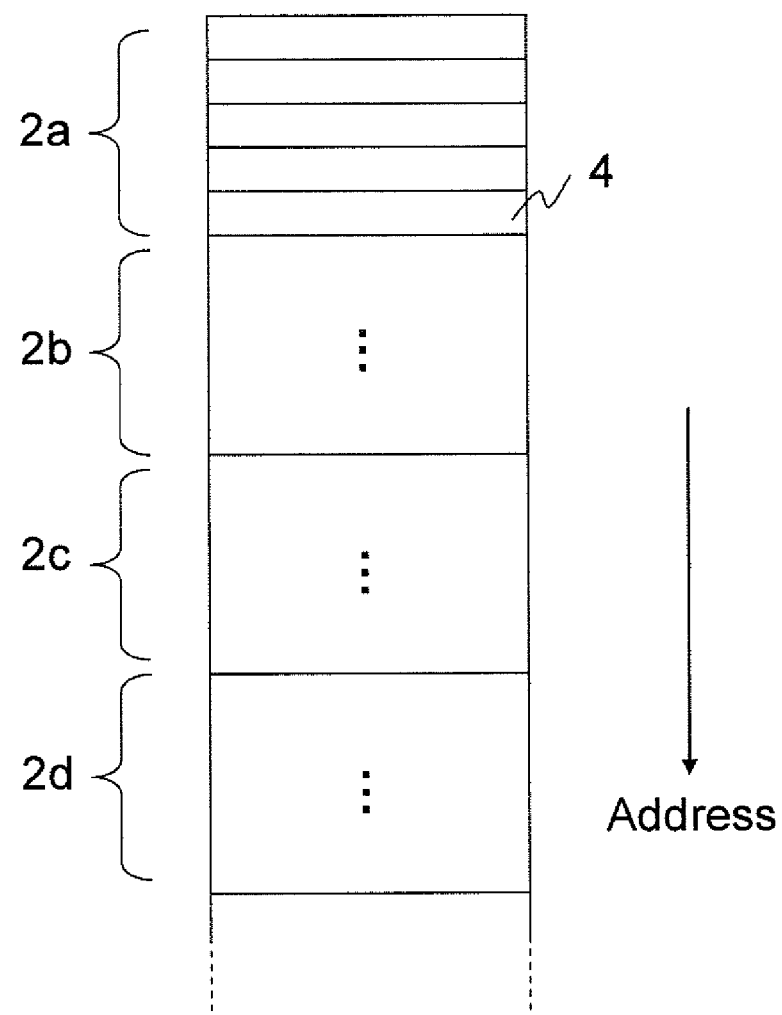
FIG. 1 is a schematic representation of a memory.
Figure 2:
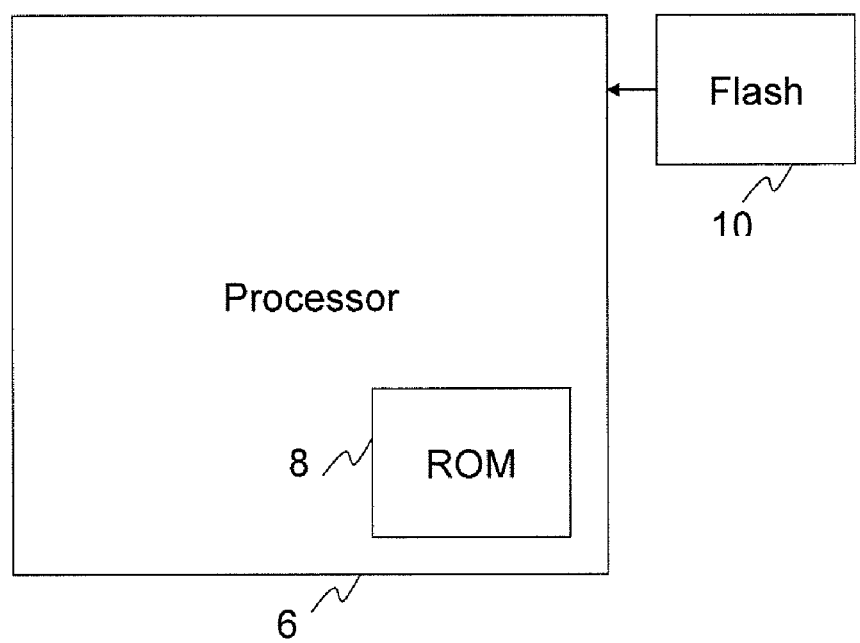
FIG. 2 is a schematic block diagram of a processor with boot memory.

An exemplary system according to a preferred embodiment of the present invention is now described in relation to FIG. 2. The system comprises a processor chip 6 having an internal ROM 8 and connected to an external NAND flash memory 10. The ROM 8 is configured as a primary boot memory containing primary boot code and the flash 10 is configured as a secondary boot memory containing secondary boot code. Boot code may be referred to as a "boot image".

For example, the chip used may be designed by Icera and sold under the trade name Livanto®.

In operation, when the processor is first turned on or rebooted, it automatically begins to execute the primary boot code from the primary memory. Amongst other basic boot code for basic initialisation of the processor as will be familiar to a person skilled in the art, the primary boot code also contains code instructing the processor to access and execute the secondary boot code, or boot image, from the secondary boot memory in order to initialise additional, customisable aspects of the system.

The primary boot ROM 8 is part of the chip 6, and changing the primary boot involves making new mask sets, building new chips, etc. But the secondary boot image is held in external, rewritable flash memory 10. Thus it is highly undesirable to change the primary boot ROM, but easy to change the contents of the secondary boot memory to support different features, protocols, standards, etc. It can therefore be seen that flash devices are useful as boot memory, but they are also prone to errors including read disturbance errors as discussed above. It would therefore be desirable to provide a mechanism for protecting against the effects of read disturbance errors.

NAND memory offers high storage density but does not guarantee storage integrity. This makes NAND far more complex to use than NOR memory. Nevertheless, it is sometimes desirable to use NAND devices, both for storage of code and for an executing application to use for non-volatile storage of data (e.g. to implement a NAND flash file system).

As mentioned, NAND devices are composed of blocks, each consisting of pages which comprise normal bytes plus spare bytes used to store additional data such as a manufacturer's ECC information. If any page within a block is "bad" then the block should be considered "bad" and should not be used in order to avoid potential boot failures.

The areas of NAND used to contain data structures and executable images for booting must be distinct from blocks used for other purposes (e.g. to provide a NAND based file system) in order to avoid interference with bad block management strategies used to hold boot ROM related data and to maximise the lifetime of these areas.

When NAND devices are shipped from the factory, block 0 is typically guaranteed to be error free. However, other blocks may be bad and are marked in a manufacturer or device specific manner. During the lifetime of the device, erase and program operations to previously good blocks may result in them becoming bad. As discussed, the read lifetime of blocks is also limited by read disturbance. The exact details of read-disturbance in terms of the number of reads before problems occur, and in terms of what action should be taken to cope with these errors, vary between different manufacturers' devices. Some manufacturers state that blocks should be erased and reprogrammed, some manufacturers state that the blocks can corrected with ECC algorithms, whilst some other manufacturers state that the blocks should be abandoned and the data re-written to a new location. Also, some device techniques for obtaining the bad-block information also involve reading multiple pages in a block (typically two) and so further decrease the read lifetime of those blocks.

The NAND read reliability issue is that read operations involve passing current through a number of cells which can "leak" and thus cause the "floating" cells used to store the 0/1 state to be corrupted. MLC (Multi-Level Cell) NAND devices are more likely to suffer such issues as errors in the "floating" cells will corrupt more than 1 bit of data.

It is believed that other newly emerging types of memory such as NRAM (nano-RAM), MRAM (Magnetoresistive RAM) and FeRAM (Ferroelectric RAM) may also experience similar read-disturbance issues to NAND flash.

Due to the variable nature of these issues, it would be preferable to allow the primary boot ROM to be manufacturer and device agnostic.

Embodiments of the invention provide an infrastructure which provides basic reliability/redundancy features to allow software to use manufacturer or device specific methods to cope with read disturb errors. As discussed in more detail below, in preferred embodiments this infrastructure involves pre-formatting the NAND device to include a NAND header and bad-block bitmap, protecting this information using ECC such that errors can be detected and some corrected, and providing support for multiple copies of the header and bad-block bitmap and executable images to add redundancy in the case of unexpected block failure.

According to the illustrated embodiments of the present invention, the secondary boot image is arranged in the secondary memory 10 according to a predetermined data structure. In order to access the secondary boot image, the primary boot code must contain code which accesses the data structure in the appropriate manner. Or looked at from the other point of view, the secondary boot memory 10 must be formatted to contain a data structure which can be recognised by the primary boot memory 8.

Preferably this data structure will allow access to a wide variety of different flash devices 10 from a relatively generic primary boot code, with the device specific error handling code such as the manufacturer's ECCs being implemented in the secondary boot image in the secondary boot memory 10. But since the ECC or other device/manufacturer specific error handling code can't be used until the secondary boot image is retrieved from the secondary memory 10, the data structure must support some form of more generic error handling in order to successfully acquire the secondary boot image in the first place despite the effects of errors which might develop in the secondary flash boot memory 10 due to read disturbance.

Figure 3:
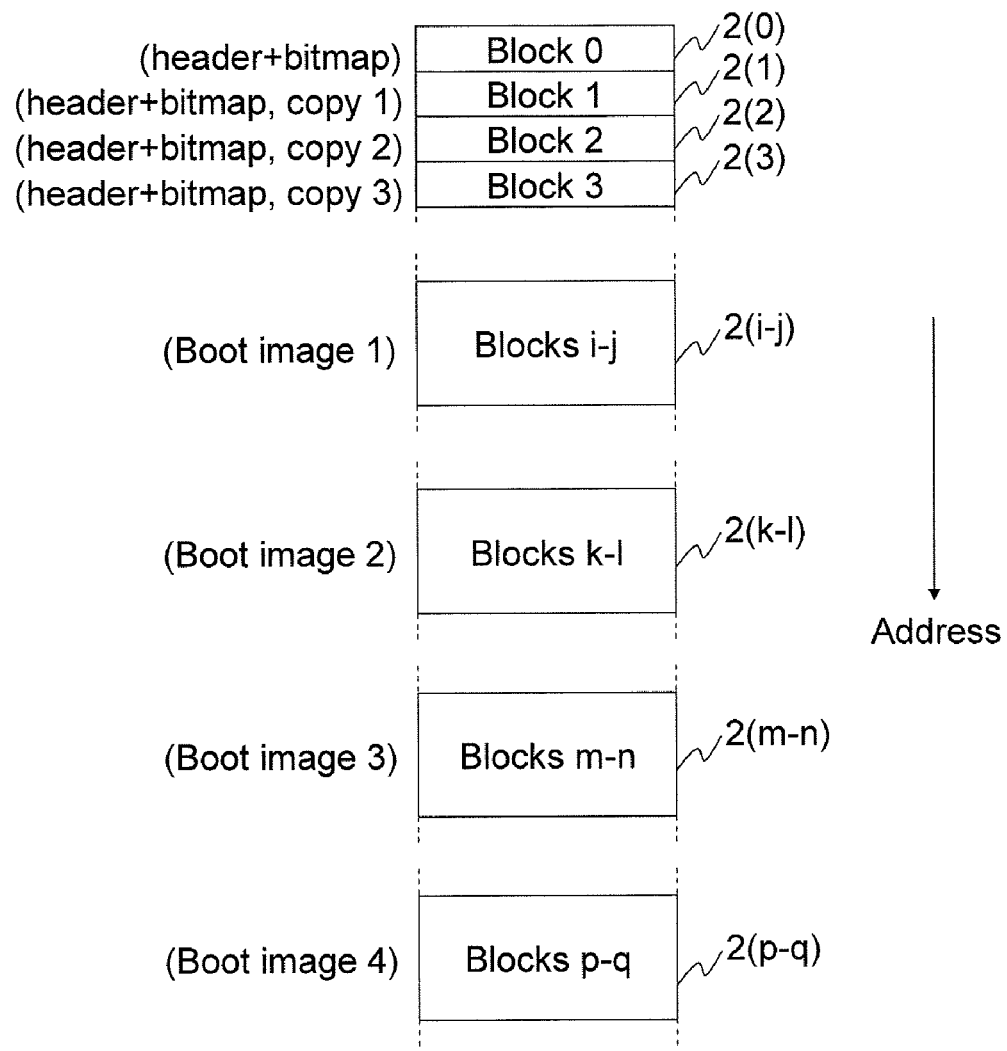
FIG. 3 is a schematic representation of a data structure.

A preferred example of such a data structure is now described in relation to FIG. 3, which is a schematic representation of a plurality of memory regions in address space, made up of blocks 2. The data structure comprises a first redundant copy of the NAND header and bad-block bitmap at block 0, a second redundant copy of the NAND header and bad-block bitmap at block 1, a third redundant copy of the NAND header and bad-block bitmap at block 2, and a fourth redundant copy of the NAND header and bad-block bitmap at block 3. The data structure further comprises a first redundant copy of the secondary boot image located in a memory region comprising a plurality of blocks i to j, a second redundant copy of the secondary boot image located in a memory region comprising a plurality of blocks k to l, a third redundant copy of the secondary boot image located in a memory region comprising a plurality of blocks m-n, and a fourth redundant copy of the secondary boot image located in a memory region comprising a plurality of blocks p-q (note, the blocks making up a given image need not necessarily be contiguous).

On a point of terminology, note that "redundant" as used herein can refer to all of the versions of the information present (even though, in a sense, one of those versions may be considered necessary). So for example if there are said to be N redundant images, this means there are N images in total (rather than N+1). Or more generally, if there are said to be N redundant portions of boot information, this means there are N portions. Redundant versions of the same information are versions which are intended to be identical, but in practice may not be identical due to errors.

Block 0 is typically guaranteed to be good upon manufacture, and so is used for the NAND header and bad-block bitmap information. This information is read by the primary boot ROM 8 when it first accesses the NAND device. In order to cope with situations in which block 0 may wear out and the application may have to rewrite the NAND header and bad-block bitmap, three further copies of the NAND header and bad-block bitmap are implemented using blocks 1, 2 and 3. Each of these copies is only used by the boot ROM 8 if failure occurs in the preceding copy. Unlike block 0, it is not guaranteed that blocks 1, 2 and 3 are good at the point of NAND manufacture. However, there is little opportunity to identify alternative good blocks if block 0 is not readable.

Note that for some future MLC (Multi-Level Cell) NAND devices where the storage is even denser, the error properties may be even worse than current NANDs and it may be that block 0 will not always be guaranteed to be error free.

Note also, the choice of four copies of the header, bitmap and image is somewhat arbitrary. The point is that there at least 2 so that there is some redundancy.

Each NAND header in each of blocks 0-3 identifies all of the start blocks i, k, m and p of the secondary boot images in the secondary flash boot memory 10. Thus the NAND header is used by the ROM 8 to locate the boot images when booting. The bad-block bitmap in each of blocks 0-3 indicates the start and end addresses of bad areas in the secondary flash memory 10, and is used during booting in order to skip known bad blocks in the boot image. The blocks in the images are sequential but can include bad blocks which are skipped over if they are known to be bad. In embodiments of the present invention the bad block bitmap is used to determine this in a non device-specific manner.

Each image includes a respective image header (not shown) which includes, amongst other potential information, a byte count indicating the size of the image (used to determine how many page(s) need to be read during the image acquisition process) and is also security signed using public key encryption which will be discussed in further detail below.

The flash memory 10 may also contain application images of applications which may be run on the processor 6 after the boot using the secondary boot image has been completed.

The NAND header preferably starts at the first page of each of blocks 0 ... 3. Example details of the NAND header in each of blocks 0-3 are as follows:

| Byte Offset | Use |
| --- | --- |
| 0 ... 3 | Must contain a specific string to mark the header as present. |
| 4 ... 7 | Version number. |
| 8 ... 11 | Number of time programmed: provided so that software can choose to implement block replacement when it is known that the number of writes is close to exceeding the devices recommended write lifetime. |
| 12 ... 15 | Number of blocks in device: intended for use by software to determine the maximum legal block ID. |
| 16 ... 19 | Block ID of this header: set to the block ID at which this header is written. |
| 20 ... 23 | First block in boot image: an array of four values to indicate whether each of the four executable secondary boot images are present are invalid or valid, and if valid the start block for each image. |
| 24 ... 39 | First block in non-boot image: an array of four values to indicate other start blocks required by the secondary boot. The primary boot ROM 8 does not use these values, and they are free for any use required by the secondary boot. |
| 39 ... 51 | Last block used by images: the end block IDs of the secondary boot images and application images. These may be provided for example in case the secondary boot image needs to know the whereabouts of the application image or the application image needs to know the whereabouts of the secondary boot images. |

The bad-block bitmap then preferably starts at the next page immediately following the NAND header in each of blocks 0 to 3 (i.e. the second page in the block). For example, it may consist of an array of 32-bit integers, each integer describing 32 blocks, either as good if the respective bit position is 0b0 or bad if the respective bit position is 0b1.

Figure 4:
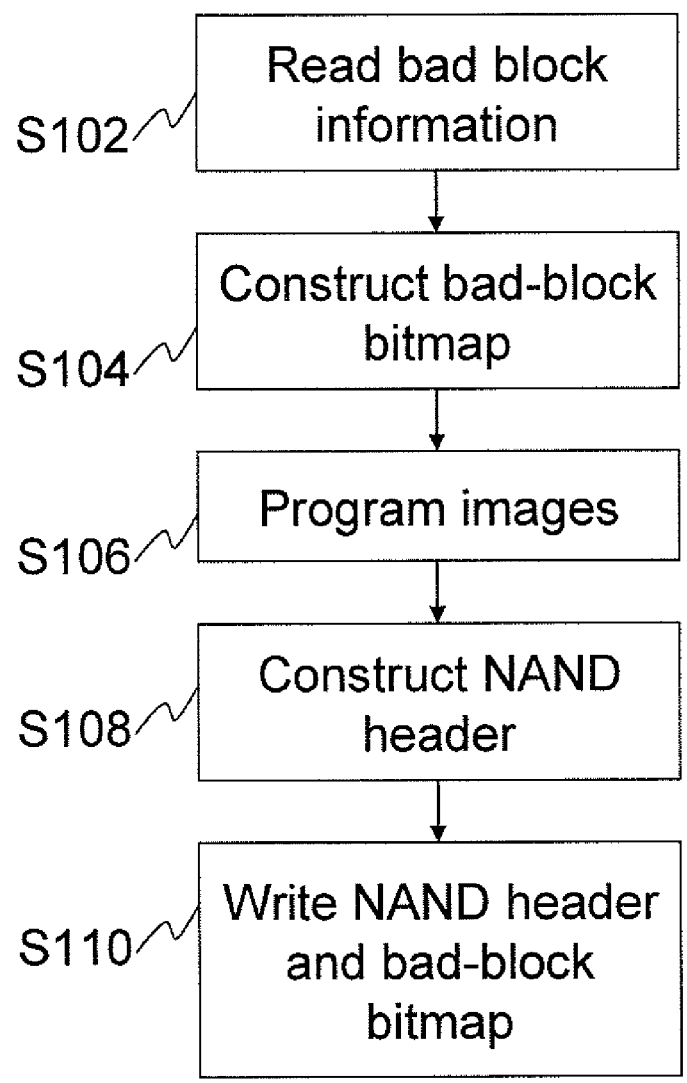
FIG. 4 is a flow chart of a method of formatting a memory.

The factory ROM programming environment must be capable of formatting and duplicating the flash 10 according to the data structure as described above. The steps involved in formatting are now described in relation to the flow chart of FIG. 4, these steps preferably being implemented in a software development tool program.

At step S102, the initial bad block information is read from the flash memory device 10 in the required vendor/manufacturer/device specific manner. This may for example involve scanning through each block to detect the tagged pages in bad blocks. Note, the bad block information used only has to encompass the blocks required to form the headers, secondary boot images, and application images. Although it can be useful if the bitmap also includes some "spare" blocks to be used for rewriting by the secondary boot. One reason why its potentially useful to include the status of all blocks is so the "post manufacture test boot" of the system can use the information in order to format the file system in the remainder of the blocks as required (but the initial "factory program" is not precluded from also including this information when the device is programmed).

At step S104, this bad block information is accumulated together and used to construct the bad-block bitmap. At step S106, the application images and plurality of redundant secondary boot images are written to the flash device 10, noting the start (and optionally end) blocks of each image for use in the header. At step S108 the NAND header is constructed from this start information and potentially other header information. At step 110, the plurality of NAND headers and bad-block bitmaps are written to each of blocks 0 to 3.

Note, during formatting the boot images, headers and bad-block bit bitmaps are preferably written to the secondary memory 10 using ECC and/or CRC rules (details of which are known in the art) so that subsequently occurring errors in the secondary memory 10 can later be detected by the primary boot 8 using corresponding ECC and/or CRC algorithms.

Any secondary boot mechanism for handling read disturbance errors in the blocks holding the NAND header and bad-block bitmap preferably require at least two out of the four available blocks (0 . . . 3) to be good (as when reprogramming to reset the disturb limit, blocks are preferably reprogrammed two at a time). Ideally, a factory programming environment will reject NAND flash devices which have all of blocks 1, 2 and 3 marked as bad (block 0 is typically guaranteed good at the point of manufacture). If this is not possible, these devices will suffer a reduced lifetime due to read disturb errors.

Figure 5:
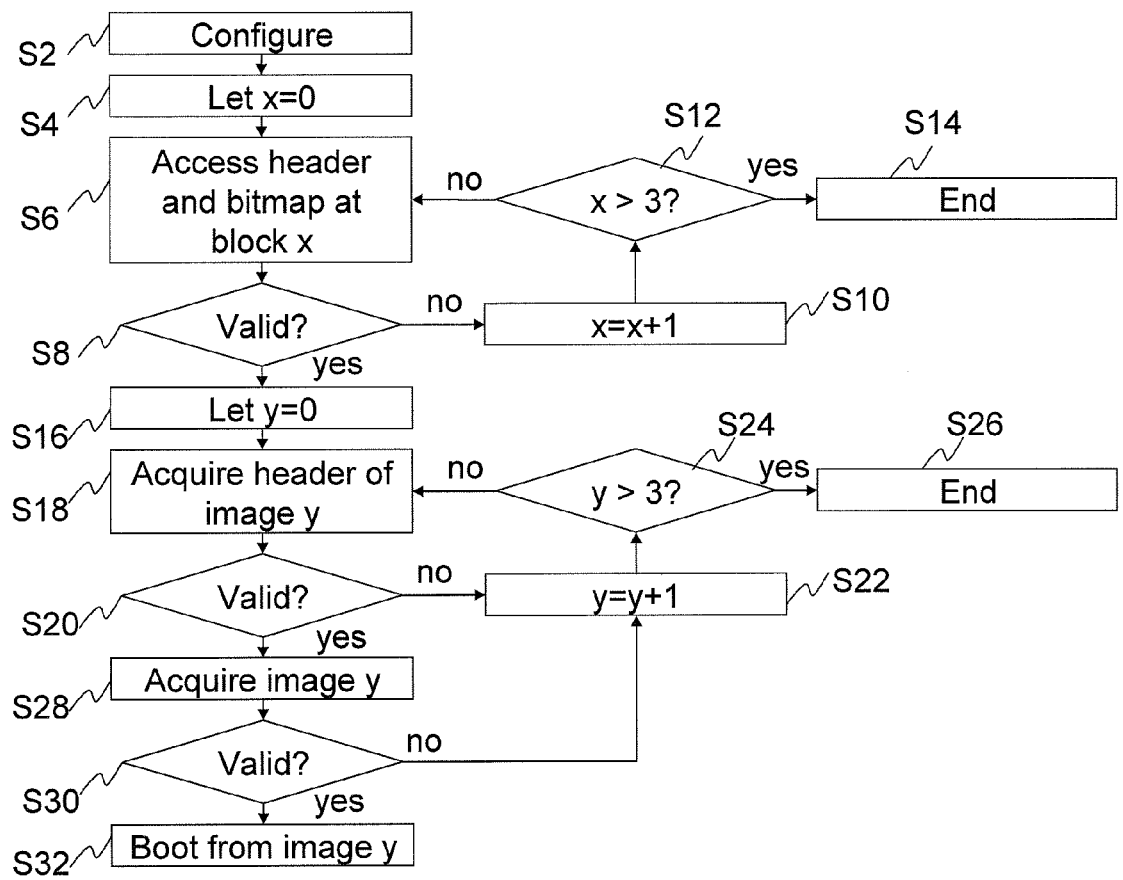
FIG. 5 is a flow chart of a method of checking for errors.

FIG. 5 is a flow chart illustrating the steps by which the primary boot code accesses the data structure of the secondary flash NAND boot memory 10 (or rather, the steps when the primary boot code from the primary boot ROM 8 is executed by the processor 6).

At step S2, the primary boot code performs an initial configuration, e.g. to determine a configuration word for the NAND 10, to determine which pins of the processor 6 the NAND 10 is connected to, and/or to configure an interface via which the processor 6 is to interact with the NAND 10.

At step S4, the primary boot code begin by considering the first NAND header and bad-block bitmap (x=0). At step the S6, the primary boot code accesses the first redundant NAND header and bad-block bitmap at the corresponding block 0. At step S8, the primary boot code determines whether the first block is valid. This may be achieved for example by means of ECC codes or a CRC checksum, details of which will be familiar to a person skilled in the art (note that while the details of how errors are compensated for or corrected once detected are typically specific to a particular NAND manufacturer or device and thus preferably not implemented in the primary boot ROM 8, the technique for initially detecting the errors may be more generic and thus can be implemented in the ROM 8).

If the first block 0 is not found to be valid, the primary boot code moves on to step S10 where it considers the next block (x=x+1). At step S12, the primary boot code determines whether all redundant blocks have already been checked (i.e. whether x is greater than the number of redundant NAND header blocks, in this case four). If so, the primary boot code moves to step S14 where the boot fails. But if not, the primary boot code repeats the cycle of steps S6 to S12 in relation to subsequent redundant NAND headers and bad-block bitmaps until a valid block containing a valid NAND header and valid bad-block bitmap is found.

The primary boot code then continues to step S16 where it considers the first redundant secondary boot image (y=0). At step S18, the primary boot code acquires the image header of the first redundant image from the corresponding start block as identified in the valid NAND header. At step S20, the primary boot code determines whether the first image header is valid, again for example using ECC codes or a CRC checksum.

If the first image header is not found to be valid, the primary boot code proceeds to step S22 where it considers the image header of the next redundant secondary boot image (y=y+1). At step S24, the boot code determines whether all the redundant secondary boot images have already been checked. If so, the boot code moves to step S26 where the boot fails. But if not, the primary boot code repeats the cycle of steps S18 to S24 in relation to the image headers of subsequent redundant secondary boot images until a valid image header is found.

The primary boot code then continues to step S28 where it acquires the rest of the secondary boot image having the valid header. The acquire operation involves reading blocks (skipping over blocks marked as bad by the bad block bitmap) until the number of bytes read is equal to the image size as indicated in the image header. At step S30, the primary boot code determines whether that secondary boot image is valid, again for example by ECC codes or CRC checksum. If not, the primary boot code returns to step S22 to look for another redundant secondary boot image having a valid image header. But if so, the primary boot code has found a valid, usable secondary boot image and the processor proceeds to continue part of the boot from the secondary boot memory using this valid secondary boot image.

Preferably, the secondary boot image contains code for handling any errors found in the NAND header/bad-block bitmap blocks 0 to 3 or the secondary boot image blocks i-j, k-l, m-n and p-q. Alternatively or additionally, one or more application images may be configured to perform error handling after the boot has been completed.

This handling of errors may involve correcting the error(s) using ECC algorithms, erasing and re-programming the erroneous block(s), or abandoning the erroneous block(s) as bad and rewriting to new blocks, as appropriate to the device or manufacturer specifications in question. Note that in the case of reprogramming, the above data structure advantageously allows individual blocks to be reprogrammed instead of having to reprogram whole images.

As mentioned, the error handling code is typically specific to a particular NAND manufacturer or device 10, which is why it is preferably implemented in the secondary boot memory 10 instead of the primary boot ROM 8 which is ideally more generic in that it should be compatible with a wide variety of different secondary devices 10.

In a particularly advantageous embodiment, the header of each redundant secondary boot image denotes the byte size of the image, and the entire image is security signed using a public-key encryption technique (using a standard public-key encryption algorithm). This security signing uses a private key known to the maker of the processor 6, and a public key known to the creator of the secondary boot image, and is used to detect whether the external secondary memory 10 is authorised for use with the processor 6. In this case, the error check performed by the primary boot code on the image header (step S20) also doubles as a security check, because any unauthorised header not containing the correct signature will fail the check. Note that the security check is a public key encryption/decryption over the whole boot image (including its header), providing a fully bit-accurate validity and security test.

Note also that during the lifetime of the device the executable images will not typically be erased and reprogrammed more than a couple of times, and thus not often enough for these blocks to wear out (the only reason for re-erasing and reprogramming these blocks is for occasional firmware updates, or potentially in order to cope with read disturb issues). However, an application using the NAND (e.g. when implementing a file system) will involve frequent erase and reprogram operations on blocks (even when wear levelling techniques are used) and so blocks will become bad during the lifetime of the NAND device and will therefore require marking blocks as bad. In order to maximise the lifetime of the blocks used by the boot ROM 8, it is highly desirable not to update the block 0-3 bad-block bitmaps to denote newly bad status for blocks not used for booting. Therefore if an application uses the NAND to implement a file system, it is recommended that a separate copy of the header and bad-block bitmap is used at a location other than blocks 0-3. This will allow the application to separate its bad block management and block rewrite strategy separate from the boot ROM 8's bad-block management.

Furthermore, note that if an error handling application does rewrite the NAND header and bad-block bitmap, it should erase and reprogram the blocks in reverse address order. That is to say, if an application rewrites the headers and bitmaps at block 0 and 1, it should erase and reprogram the block 1 version before the block 0 version (and similarly the block 2 version before the block 1 version, and block 3 version before the block 2 version, if necessary). This will allow a usable header to be in place even if the operation fails due to catastrophic failure or power-down during the program operation. A similar idea can be applied to rewrite images in reverse address order.

This is to provide maximum chances of still being able to boot a "last known good" bitmap and/or image if a fault occurs during a software update operation. The assumption is that the secondary boot should always try to ensure that bad blocks are repaired if possible and so it can be assumed that repairable faults in blocks 0 . . . 3 and images 0 . . . 3 have been repaired before attempting to update the NAND. The boot algorithm (as described in relation to FIG. 5) will always use the lowest numbered good block for the bad block bitmap, and the lowest numbered good image. Thus if the higher numbered bad block bitmaps and images are reprogrammed first and something goes wrong, the next boot attempt will use a "good" image which still exists in a lower numbers bad block bitmap/image number. This will result in the processor booting from the "old" image and then being able to re-perform the update operation.

According to everything discussed above, preferred embodiments of the present invention have the following advantageous features.

Providing a data structure and algorithm to cope with read-disturb errors.

Using standard ECC (Error Correcting Code) to cope with a limited number of errors (these typically can correct 1 bit error per 512 bytes).

Keeping multiple copies of the image, such that if an image fails the processor can boot from a backup image. These backup images can then reprogram the NAND to remove/correct the errors which prevented the first image from being read correctly.

Arranging the images such that parts that have reached their read-disturb limit can be re-written.

The data structure includes features to show the start block of each image and pass relevant information between the boot ROM and secondary boot to allow the latter to reprogram as necessary.

The encoding of multiple redundant copies of the NAND header and bad-block bitmap to cope with these blocks wearing out.

The reprogramming/rewriting of these blocks in backwards order such that if power is removed during the erase/program then booting can still be achieved (as the CRC check will fail for damaged copies, and the next copy of the NAND header and bad-block bitmap will be moved onto).

The data structures allow individual blocks to be rewritten rather than forcing the whole image to be rewritten. This avoids the need to rewrite the NAND header and bad-block bitmap, which may otherwise need to be erased and reprogrammed on each on each individual rewrite to other blocks, and would cause these blocks to rewrite prematurely.

The use of authentication to provide security and full error detection (ECC alone can only perform partial error detection, and partial error correction). That is, using boot ROM authentication to provide security (such that it can be detected whether the image is authorised) and also providing a full bit-accurate detection of any read errors not corrected by ECC. Thus it can be detected whether an image is good or bad. If this authentication was not performed, more ECC may need to be stored. So the solution not only adds security, it also gives full correctness information.

The functional partitioning between the boot ROM which doesn't know about the different error behaviours of devices and the secondary boot image (which exists in NAND so is easily changed) which can deal with the error behaviour. The boot ROM and secondary NAND boot memory use common information in the NAND header and bad-block bitmap to achieve this.

It will be appreciated that the above embodiments have been described only by way of example.

In one alternative embodiment, it is possible that no on-chip boot ROM is provided (in which case, the primary and secondary memories may be different areas of the same external memory device).

This would conventionally require that the target processor is capable of booting directly from an external memory device which acts as a 100% robust boot source and supports Execute in Place (XIP), e.g. typically a NOR flash (XIP allows code to be run from the same location at which it is permanently stored, which is not supported by NAND). The disadvantage with such techniques is that these types of devices are not particularly high capacity, and are generally more expensive than forms of storage with some error properties (such as NAND). Thus using devices such as NOR rather than NAND costs more, and requires more board space (as it might require NOR for Boot storage plus NAND for file system, or perhaps multiple NOR devices to achieve the necessary storage capacity).

But in embodiments, the data structure of the present invention allow robustness to be achieved using a single external device, e.g. a single NAND flash, as both the boot source and as the file system, which has both cost and board-space advantages.

A further advantageous application of the invention is as follows. Many existing embedded consumer electronic devices (e.g. set top boxes, DAB radios, DVD players, network routers etc.) include in-the-field software update facilities whereby newer versions of the software can be downloaded by the user. When using these systems great care has to be taken to not power off the device during the reprogramming phase when the image may be partially re-written, such that the boot image is corrupted, rendering the device defunct and requiring it to be returned to the vendor for a factory repair or upgrade. Hence the user instructions usually include warnings about being careful. Provision of a software system using multiple redundant images and the other techniques described in this application can avoid problems causing the device to be rendered defunct. The point about rewriting images and bad-block bitmaps in reverse order (as discussed above) is particularly applicable in such situations.

Furthermore, the primary boot ROM 8 may be configured to pass an additional data structure to the executing secondary boot image after it has been acquired for execution on the processor 6 (i.e. the secondary boot image has access to the additional data structure which is located on the primary boot ROM 8). This additional data structure includes a range of fields related to booting from the secondary boot memory 10, preferably including information about ECC and/or CRC detected errors, for example:

| Field Name | Explanation/Value |
|---|---|
| Header Index | If the secondary boot image was acquired from the NAND, this is the index of the NAND header used; else 0x0. |
| Secondary Boot Image | If the secondary boot image was acquired from the NAND, this is the index of the secondary boot image used; else 0x0. |
| No. Page Errors | If the secondary boot was acquired from the NAND, this is the number of pages containing errors corrected by the ECC for the secondary boot image at the given index; else 0x0. |
| Non-Boot Page IDS | If the secondary boot was acquired from the NAND, this contains the page IDs of non-boot page IDs. |
| Error Page IDs | If the secondary boot was acquired from the NAND, each non-zero index contains the page ID of one page from which the secondary boot was successfully acquired but contained an ECC error, preferably allowing up to sixteen page IDs to be passed to the secondary boot. This, in conjunction with the page error count, can be used to influence the block reprogram strategy. If the secondary boot was not acquired from the NAND then this field is 0x0. |

By use of this additional data structure provided by the primary boot ROM 8, this means that the secondary boot image does not need to re-read the NAND flash 10 to determine whether any errors were found during booting and whether any reprogramming should be performed. Hence read-disturbance is reduced. If this additional data structure was not provided by the primary boot ROM 8, then the secondary boot would need to perform a read of the NAND flash after every boot purely to determine whether errors exist within it.

Other applications and configurations may be apparent to a person skilled in the art. The primary and secondary memories could be of different types or the same type, could be part of same memory device or array or different devices or arrays, and/or each could be either internal or external to the processor being booted. Further, different forms of error checking and different methods of correcting or compensating for errors may be known in the art, and any of these may be suitable. Further, the invention may apply to chips other than the Livanto®.

The scope of the invention is not limited by the above description, but only by the following claims.

The invention claimed is:

1. A method of protecting against errors in a boot memory, the method comprising initiating booting of a processor by executing primary boot code from a primary boot memory, and based on the execution of the primary boot code:
accessing a data structure comprising a plurality of redundant portions of boot information stored on a secondary boot memory;
performing an error check on a plurality of said portions to determine whether those portions contain errors and, based on the error checks, to identify a valid portion; and
booting the processor using said valid portion of boot information;
wherein:
the plurality of redundant portions comprises a plurality of redundant bad-area maps stored at predetermined memory locations within the secondary boot memory, each map identifying bad areas within the secondary boot memory;

the performing of said error checks comprises performing an error check on a plurality of said maps to determine whether those maps contain errors and to identify a valid map; and the booting of the processor using the valid boot information comprises using the valid map to acquire a valid boot image booting using the valid boot image.

2. The method according to claim 1, wherein:
the plurality of redundant portions comprises a plurality of redundant boot images stored on the secondary boot memory;
the performing of said error checks comprises performing an error check on a plurality of said boot images to determine whether those images contain errors and to identify a valid boot image; and
the booting of the processor using the valid boot information comprises booting the processor using the valid boot image.

3. The method according to claim 1, wherein the primary boot memory is a separate memory device from the second boot memory.

4. The method according to claim 1, wherein the secondary boot memory comprises a flash memory, the data structure being stored on the flash memory.

5. The method according to claim 4, wherein said flash memory comprises a NAND flash memory.

6. The method according to claim 4, wherein said flash memory comprises one of: an NRAM, an MRAM, and an FeRAM.

7. The method according to claim 1, wherein the secondary boot memory is of a type susceptible to hard and soft errors.

8. The method according to claim 1, wherein the primary boot memory comprises a ROM, the primary boot code being stored on the ROM.

9. The method according to claim 1, comprising correcting for an error detected by one of said error checks using error handling code retrieved from the secondary boot memory following the booting of the processor using the valid boot information.

10. The method according to claim 1, comprising correcting for an error detected by one of said error checks by re-writing a portion containing an error from the valid portion.

11. The method according to claim 10, wherein the second boot memory is divided into areas, with each of said redundant portions comprising a plurality of areas, and said re-writing comprises re-writing only the area or areas in which an error was detected.

12. The method according to claim 10, wherein the second boot memory is divided into areas, with each of said redundant portions comprising a plurality of areas, and the re-writing is performed in reverse address order.

13. The method according to claim 1, wherein:
the second boot memory is divided into areas, at least one of which areas is determined to be error free upon manufacture; and
at least one of the bad area maps and first headers is accessed from said error-free area.

14. The method according to claim 1, comprising:
making a copy of the bad area map separate from each of said redundant maps; and
implementing a file system in the secondary memory using said copy of the bad area map, including reprogramming said copy of the bad area map in association with use of the file system without performing a corresponding reprogramming of the redundant maps.

15. The method according to claim 1, comprising creating an additional data structure accessible from the primary boot memory, the additional data structure containing information on errors found in the secondary boot memory during said error check;
wherein said booting using the valid information from the secondary boot memory comprises accessing said additional data structure from the primary boot memory.

16. A computer program product comprising code which when executed by a processor performs the steps according to the method of claim 1.

17. A method of protecting against errors in a boot memory, the method comprising initiating booting of a processor by executing primary boot code from a primary boot memory, and based on the execution of the primary boot code:
accessing a data structure comprising a plurality redundant portions of boot information stored on a secondary boot memory;
performing an error check on a plurality of said portions to determine whether those portions contain errors and, based on the error checks, to identify a valid portion; and
bootingg the processor using said valid portion of boot information;
wherein:
the plurality of redundant portions comprises a plurality of redundant boot images stored on the secondary boot memory;
the performing of said error checks comprises performing an error check on a plurality of said boot images to determine whether those images contain errors and to identify a valid boot image;
the booting of the processor using the valid boot information comprises booting the processor using the valid boot image;
the plurality of redundant portions comprises a plurality of redundant first headers, each first header specifying at least the memory locations of said boot images within the secondary boot memory;
the performing of said error checks comprises performing an error check on a plurality of said first headers to determine whether those headers contain errors and to identify a valid first header; and
the booting of the processor using the valid boot information comprises locating the valid boot image using the valid first header.

18. The method according to claim 17, wherein:
the plurality of redundant portions comprises a plurality of redundant bad-area maps stored at predetermined memory locations within the secondary boot memory, each map identifying bad areas within the secondary boot memory;
the performing of said error checks comprises performing an error check on a plurality of said maps to determine whether those maps contain errors and to identify a valid map; and
the booting of the processor using the valid boot information comprises using the valid map to acquire the valid boot image and booting the processor using the valid boot image.

19. A method of protecting against errors in a boot memory, the method comprising initiating booting of a processor by executing primary boot code from a primary boot memory, and based on the execution of the primary boot code:

accessing a data structure comprising a plurality of redundant portions of boot information stored on a secondary boot memory;

performing an error check on a plurality of said portions to determine whether those portions contain errors and, based on the error checks, to identify a valid portion; and booting the processor using said valid portion of boot information;

wherein:

the plurality of redundant portions comprises a plurality of redundant boot images stored on the secondary boot memory;

the performing of said error checks comprises performing an error check on a plurality of said boot images to determine whether those images contain errors and to identify a valid boot image;

the booting of the processor using the valid boot information comprises booting the processor using the valid boot image;

each of said boot images includes a second header; and the performing of said error checks comprises performing an error check on a plurality of the second headers, and only performing an error check on the remainder of the respective boot image if no error is found in the corresponding second header.

20. A method of protecting against errors in a boot memory the method comprising initiating booting of a processor by executing primary boot code from a primary boot memory, and based on the execution of the primary boot code:

accessing a data structure comprising a plurality of redundant portions of boot information stored on a secondary boot memory;

performing an error check on a plurality of said portions to determine whether those portions contain errors and, based on the error checks, to identify a valid portion; and booting the processor using said valid portion of boot information;

wherein:

the plurality of redundant portions comprises a plurality of redundant boot images stored on the secondary boot memory;

the performing of said error checks comprises performing an error check on a plurality of said boot images to determine whether those images contain errors and to identify a valid boot image;

the booting of the processor using the valid boot information comprises booting the processor using the valid boot image;

each of the boot images is public-key encrypted such that it is security signed; and the performing of said error checks on each of said boot images comprises performing a decryption on each of the boot images, the error check doubling as an authorisation check such that if an error is found the image is deemed not be authorised.

21. A system for protecting against errors when booting, comprising:

a processor;

a primary boot memory; and a secondary boot memory formatted according to a data structure comprising a plurality of redundant portions of boot information stored on a secondary boot memory;

wherein the primary boot memory is configured to supply primary boot code to the processor which, when executed, performs an error check on a plurality of said portions to determine whether those portions contain errors and, based on the error checks, to identify a valid portion; and the processor is arranged to boot using said valid portion of boot information;

wherein:

the plurality of redundant portions comprises a plurality of redundant bad-area maps stored at predetermined memory locations within the secondary boot memory, each map identifying bad areas within the secondary boot memory;

said error checks comprise an error check on a plurality of said maps to determine whether those maps contain errors and to identify a valid map; and the processor is arranged to boot using the valid map to acquire a valid boot image and booting the processor using the valid boot image.

22. The system of claim 21, wherein:

the plurality of redundant portions comprises a plurality of redundant boot images stored on the secondary boot memory;

said error checks comprise an error check on a plurality of said boot images to determine whether those images contain errors and to identify a valid boot image; and the processor is arranged to boot using the valid boot image.

23. The system of claim 21, wherein the primary boot memory is a separate memory device from the second boot memory.

24. The system of claim 21, wherein the secondary boot memory comprises a flash memory, the data structure being stored on the flash memory.

25. The system of claim 24, wherein said flash memory comprises a NAND flash memory.

26. The system of claim 24, wherein said flash memory comprises one of: an NRAM, an MRAM, and an FeRAM.

27. The system of claim 21, wherein the secondary boot memory is of a type susceptible to hard and soft errors.

28. The system of claim 21, wherein the primary boot memory comprises a ROM, the primary boot code being stored on the ROM.

29. The system of claim 21, wherein the processor is arranged to correct for an error detected by one of said error checks using error handling code retrieved from the secondary boot memory following the booting of the processor using the valid boot information.

30. The system of claim 29, wherein the error handling code is configured to correct for an error detected by one of said error checks by re-writing a portion containing an error from the valid portion.

31. The system of claim 30, wherein the second boot memory is divided into areas, with each of said redundant portions comprising a plurality of areas, and the error handling code is configured to re-writing only the area or areas in which an error was detected.

32. The system of claim 30, wherein the second boot memory is divided into areas, with each of said redundant portions comprising a plurality of areas, and error handling code is configured to re-write the areas in reverse address order.

33. The system of claim 21, wherein:

the second boot memory is divided into areas, at least one of which areas is determined to be error free upon manufacture; and at least one of the bad area maps and first headers is stored on said error-free area.

34. The system of claim 21, wherein the processor is arranged to:
  make a copy of the bad area map separate from each of said redundant maps; and
  implement a file system in the secondary memory using said copy of the bad area map, including reprogramming said copy of the bad area map in association with use of the file system without performing a corresponding reprogramming of the redundant maps.

35. The system of claim 21, wherein the processor is arranged to:
  create an additional data structure in the primary boot memory, the additional data structure containing information on errors found in the secondary boot memory during said error checks; and
  boot using said additional data structure.

36. A system for protecting against errors when booting, comprising:
  a processor;
  a primary boot memory; and
  a secondary boot memory formatted according to a data structure comprising a plurality of redundant portions of boot information stored on a secondary boot memory;
  wherein the primary boot memory is configured to supply primary boot code to the processor which, when executed, performs an error check on a plurality of said portions to determine whether those portions contain errors and, based on the error checks, to identify a valid portion; and
  the processor is arranged to boot using said valid portion of boot information;
  wherein:
  the plurality of redundant portions comprises a plurality of redundant boot images stored on the secondary boot memory;
  said error checks comprise an error check on a plurality of said boot images to determine whether those images contain errors and to identify a valid boot image;
  the processor is arranged to boot using the valid boot image;
  the plurality of redundant portions comprises a plurality of redundant first headers, each first header specifying at least the memory locations of said boot images within the secondary boot memory;
  said error checks comprise an error check on a plurality of said first headers to determine whether those headers contain errors and to identify a valid first header; and
  the processor is arranged to boot using the valid first header to locate the valid boot image.

37. The system of claim 36, wherein:
  the plurality of redundant portions comprises a plurality of redundant bad-area maps stored at predetermined memory locations within the secondary boot memory, each map identifying bad areas within the secondary boot memory;
  said error checks comprise an error check on a plurality of said maps to determine whether those maps contain errors and to identify a valid map; and
  the processor is arranged to boot using the valid map to acquire the valid boot image and booting the processor using the valid boot image.

38. A system for protecting against errors when booting, comprising:
  a processor;
  a primary boot memory; and
  a secondary boot memory formatted according to a data structure comprising a plurality of redundant portions of boot information stored on a secondary boot memory;
  wherein the primary boot memory is configured to supply primary boot code to the processor which, when executed, performs an error check on a plurality of said portions to determine whether those portions contain errors and, based on the error checks, to identify a valid portion; and
  the processor is arranged to boot using said valid portion of boot information;
  wherein:
  the plurality of redundant portions comprises a plurality of redundant boot images stored on the secondary boot memory;
  said error checks comprise an error check on a plurality of said boot images to determine whether those images contain errors and to identify a valid boot image;
  the processor is arranged to boot using the valid boot image;
  each of said boot images includes a second header; and
  said error checks comprise an error check on a plurality of the second headers, the primary boot code being configured to only perform an error check on the remainder of the respective boot image if no error is found in the corresponding second header.

39. A system for protecting against errors when booting, comprising:
  a processor;
  a primary boot memory; and
  a secondary boot memory formatted according to a data structure comprising a plurality of redundant portions of boot information stored on a secondary boot memory;
  wherein the primary boot memory is configured to supply primary boot code to the processor which, when executed, performs an error check on a plurality of said portions to determine whether those portions contain errors and, based on the error checks, to identify a valid portion; and
  the processor is arranged to boot using said valid portion of boot information;
  wherein:
  the plurality of redundant portions comprises a plurality of redundant boot images stored on the secondary boot memory;
  said error checks comprise an error check on a plurality of said boot images to determine whether those images contain errors and to identify a valid boot image;
  the processor is arranged to boot using the valid boot image;
  each of the boot images is public-key encrypted such that it is security signed; and
  said error checks on each of said boot images comprise a decryption on each of the boot images, the error check doubling as an authorisation check such that if an error is found the image is deemed not be authorised.

40. A method of formatting a boot memory to protect against errors in the boot memory, the method comprising:
  collecting bad information on bad areas at respective memory locations within the memory and creating a map specifying the memory locations of the bad areas;
  writing a plurality of redundant boot images to further respective memory locations and creating a memory header comprising the memory locations of the boot images;
  writing a plurality of redundant copies of the memory header to the memory; and writing a plurality of redundant copies of the maps to the memory.

41. The method of claim 40, wherein at least one of:
the writing of the boot images,
the writing of the memory headers, and
the writing of the bad area maps
is performed using at least one of Error Correction Code (ECC) and Cyclic Redundancy Check (CRC) techniques.

42. The method of claim 40, wherein at least one of:
the writing of the boot images,
the writing of the memory headers, and
the writing of the bad area maps
is performed using public key encryption.

43. A software development tool comprising code which when executed on a computer performs the steps of claim 40.

44. A boot memory formatted according to a data structure for protecting against errors in the boot memory, the data structure comprising:
a plurality of redundant boot images at respective memory locations,
a plurality of redundant memory headers each identifying the memory locations of said boot images, and
a plurality of redundant maps identifying further memory locations of bad areas within the memory.

45. The boot memory according to claim 44, wherein at least one of:
each of the boot images,
each of the memory headers, and
each of the bad area maps
are encoded according to at least one of Error Correction code (ECC) and Cyclic Redundancy Check (CRC) techniques.

46. The boot memory according to claim 44, wherein at least one of:
each of the boot images,
each of the memory headers, and
each of the bad area maps
are encoded with public key encryption.

* * * * *

UNITED STATES PATENT AND TRADEMARK OFFICE
CERTIFICATE OF CORRECTION

| | |
|---|---|
| PATENT NO. | : 7,996,711 B2 |
| APPLICATION NO. | : 12/323563 |
| DATED | : August 9, 2011 |
| INVENTOR(S) | : D. A. Edwards et al. |

It is certified that error appears in the above-identified patent and that said Letters Patent is hereby corrected as shown below:

Claim 1, column 15, line 10, please delete "booting using" and insert --and booting--.

Claim 17, column 16, line 19, please delete "plurality redundant" and insert --plurality of redundant--.

Claim 17, column 16, line 25, please delete "bootingg" and insert --booting--.

Signed and Sealed this
Eighth Day of November, 2011

David J. Kappos
*Director of the United States Patent and Trademark Office*